Patented June 23, 1931

1,811,130

UNITED STATES PATENT OFFICE

FRITZ HOFMANN AND MICHAEL OTTO, OF BRESLAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE POLYMERIZATION OF OLEFINES

No Drawing. Application filed April 30, 1927, Serial No. 188,041, and in Germany April 22, 1926.

Boron fluoride has been repeatedly made use of for polymerizing olefines. It has not been possible however to polymerize gaseous olefines by means of boron fluoride.

We have found that a very satisfactory polymerization of the said gaseous hydrocarbons can be effected with boron fluoride by employing pressure at any desired temperatures such as room temperature and under.

For the polymerization it is not necessary to employ pure hydrocarbons as initial materials, but they can be used mixed one with the other or with other compounds or in dissolved form.

Instead of boron fluoride use can be made of its double compounds or solutions of boron fluoride.

The reaction is considerably accelerated by the addition of metals in a finely divided form, such as for instance nickel.

Examples

1. A mixture of 10 parts by weight of ethylene and 1 part by weight of boron fluoride is left for some time under an increased pressure, in which case it is not necessary, although possible to exceed room temperature. In this way 80% of the ethylene, according to the time taken, can be converted into liquid polymerizates.

2. A mixture of 10 parts by weight of technical Blau gas (containing 60 vol. percent. of olefines) and 1 part by weight of boron fluoride is treated as described in Example 1. Yield of polymerizate 60% by weight of the gas employed.

3. 10 grs. boron fluoride and 100 grs. ethylene are allowed to react together in a pressure vessel of 600 ccm. capacity. The pressure is 70 atm. Without nickel 20 grs. are polymerized after 12 hours. If nickel is applied to the walls however, all the ethylene is polymerized in three to four hours.

The products from the polymerization represent bodies or substances of a petroleum oil character. The boiling point range is as follows:

| Temperature | Oil, see Example 1, distills over | Oil, see Example 3, distills over |
|---|---|---|
| | Per cent | Per cent |
| Up to—100° (15 mm) | 0.5 | 20 |
| 150° (15 mm) | 8 | 45 |
| 150° (3 mm) | 18 | 62 |
| 200° (3 mm) boiling | 40 | 84 |
| Residue oil | 100 | 100 |

Having now more particularly described and ascertained the nature of our said invention and in what manner the same is to be performed, we declare that what we claim is:—

1. A process for polymerizing ethylene which comprises subjecting it to the action of boron fluoride under pressure.

2. A process for polymerizing ethylene, which comprises subjecting it to the action of boron fluoride under pressure with an addition of finely divided nickel.

3. A process for polymerizing ethylene which comprises subjecting it to the action of a boron fluoride under pressure.

4. A process for polymerizing ethylene which comprises subjecting it to the action of a solution of boron fluoride under pressure.

In testimony whereof we have signed our names to this specification.

FRITZ HOFMANN.
MICHAEL OTTO.